US008347018B2

(12) United States Patent
Tiruvallur et al.

(10) Patent No.: US 8,347,018 B2
(45) Date of Patent: *Jan. 1, 2013

(54) TECHNIQUES FOR BROADCASTING MESSAGES ON A POINT-TO-POINT INTERCONNECT

(75) Inventors: Keshavan K. Tiruvallur, Tigard, OR (US); Kenneth C. Creta, Gig Harbor, WA (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/569,772

(22) Filed: Sep. 29, 2009

(65) Prior Publication Data

US 2010/0017458 A1 Jan. 21, 2010

Related U.S. Application Data

(63) Continuation of application No. 10/984,527, filed on Nov. 8, 2004, now Pat. No. 7,596,653.

(51) Int. Cl.
*G06F 15/16* (2006.01)
*G06F 13/20* (2006.01)
*G06F 11/30* (2006.01)
(52) U.S. Cl. .................. 710/313; 709/202; 713/340
(58) Field of Classification Search .................. 710/313; 709/202; 713/340
See application file for complete search history.

(56) References Cited

U.S. PATENT DOCUMENTS

| 5,293,495 A * | 3/1994 | Nguyen et al. ............ 710/107 |
| 5,355,371 A | 10/1994 | Auerbach et al. |
| 5,572,678 A | 11/1996 | Homma et al. |
| 5,581,767 A | 12/1996 | Katsuki et al. |
| 5,822,519 A | 10/1998 | Watanabe |
| 5,982,775 A | 11/1999 | Brunner et al. |
| 6,009,488 A | 12/1999 | Kavipurapu |
| 6,067,567 A | 5/2000 | Bartfai et al. |
| 6,118,785 A * | 9/2000 | Araujo et al. ............ 370/401 |
| 6,122,277 A | 9/2000 | Garmire et al. |
| 6,263,397 B1 * | 7/2001 | Wu et al. ............ 710/268 |
| 6,295,573 B1 * | 9/2001 | Bailey et al. ............ 710/260 |
| 6,343,319 B1 | 1/2002 | Abensour et al. |
| 6,374,303 B1 | 4/2002 | Armitage et al. |
| 6,466,552 B1 | 10/2002 | Haumont |

(Continued)

FOREIGN PATENT DOCUMENTS

CN 1773963 5/2006

(Continued)

OTHER PUBLICATIONS

Greg Shippen, Enter the Inner Sanctum of Rapidlo: Part 1, Motorola, Nov. 24, 2003.*

(Continued)

*Primary Examiner* — Paul R Myers
*Assistant Examiner* — Christopher A Daley
(74) *Attorney, Agent, or Firm* — Caven & Aghevli LLC

(57) ABSTRACT

Techniques to broadcast a message across a point-to-point network are described. More particularly, some embodiments of the invention relate to broadcasting messages between electronics components within a point-to-point interconnect. Other embodiments are also disclosed.

21 Claims, 4 Drawing Sheets

U.S. PATENT DOCUMENTS

| | | | |
|---|---|---|---|
| 6,728,771 B2 | 4/2004 | Stumer | |
| 6,751,697 B1 | 6/2004 | Shima et al. | |
| 6,907,227 B2 | 6/2005 | Fujioka | |
| 6,941,398 B2* | 9/2005 | Lai et al. | 710/260 |
| 6,968,176 B2 | 11/2005 | Juzswik | |
| 7,095,739 B2 | 8/2006 | Mamillapalli et al. | |
| 7,127,567 B2* | 10/2006 | Ramakrishnan et al. | 711/152 |
| 7,174,467 B1* | 2/2007 | Helms et al. | 713/300 |
| 7,333,486 B2 | 2/2008 | Novaes | |
| 7,352,762 B2 | 4/2008 | Vnkateshwara et al. | |
| 7,516,236 B2 | 4/2009 | Walsh et al. | |
| 7,536,622 B2 | 5/2009 | Leon et al. | |
| 7,580,718 B2 | 8/2009 | Mademann | |
| 7,596,653 B2 | 9/2009 | Tiruvallur et al. | |
| 2002/0099893 A1* | 7/2002 | Nguyen et al. | 710/260 |
| 2003/0012132 A1 | 1/2003 | Novaes | |
| 2004/0064509 A1 | 4/2004 | Ayyagari et al. | |
| 2004/0088460 A1* | 5/2004 | Poisner | 710/260 |
| 2004/0240458 A1* | 12/2004 | T V et al. | 370/412 |
| 2005/0054353 A1 | 3/2005 | Mademann | |
| 2005/0216812 A1 | 9/2005 | Leon et al. | |
| 2005/0228922 A1* | 10/2005 | Tsao et al. | 710/268 |
| 2005/0262215 A1 | 11/2005 | Kirov et al. | |
| 2005/0276415 A1 | 12/2005 | Brett et al. | |
| 2006/0018271 A1 | 1/2006 | Alex et al. | |
| 2006/0031557 A1 | 2/2006 | Walsh et al. | |
| 2006/0141988 A1 | 6/2006 | Wendling | |
| 2008/0205446 A1* | 8/2008 | Popescu et al. | 370/473 |

FOREIGN PATENT DOCUMENTS

| | | |
|---|---|---|
| DE | 69028267 | 3/1997 |
| DE | 10215990 | 10/2003 |
| DE | 102005003011 A1 | 5/2006 |
| EP | 0420493 B1 | 8/1996 |
| EP | 0749225 | 12/1996 |

OTHER PUBLICATIONS

Greg Shippen, Enter the Inner Sanctum of RapidIO: Part 2, Motorola, Nov. 28, 2003.*

Office Action Received for German Patent Application No. 102005003011.4, mailed Sep. 3, 2005, 11 pages.

Office Action Received for Japanese Patent Application No. 200534392, mailed Nov. 13, 2007, 11 pages inclusive of English translation.

Office Action Received for Chinese Patent Application No. 200510053885.2, mailed Aug. 8, 2008, 26 pages inclusive of English translation.

Office Action Received for Chinese Patent Application No. 200510053885.2 , mailed on Apr. 17, 2009, 14 pages inclusive of English Translation.

Final Office Action Received for U.S. Appl. No. 10/984,527, mailed on Dec. 31, 2008, 14 pages.

Non Final Office Action Received for U.S. Appl. No. 10/984,527, mailed on Apr. 23, 2008, 13 pages.

Non Final Office Action Received for U.S. Appl. No. 10/984,527, mailed on Sep. 13, 2007, 13 pages.

Final Office Action Received for U.S. Appl. No. 10/984,527, mailed on Apr. 17, 2007, 12 pages.

Choi, Jong Hyuk, "A Bandwidth-Efficient Implementation of Mesh with Multiple Broadcasting", Deutsches Patend Und Markenamt, Apr. 2010, 10 pages.

Office Action Received for U.S. Appl. No. 10/984,527, mailed on Aug. 11, 2006, 12 pages.

Office Action Received for German Patent Application No. 102005003011.4, Apr. 6, 2010, 10 pages.

Office Action Received for Chinese Patent Application No, 200510053865.2, mailed Jul. 1, 2010, 12 pages of Office Action including 7 pages of English translation.

* cited by examiner

TECHNIQUES FOR BROADCASTING MESSAGES ON A POINT-TO-POINT INTERCONNECT

RELATED APPLICATION

The present application is a continuation of and claims priority from U.S. patent application Ser. No. 10/984,527, filed on Nov. 8, 2004, entitled "TECHNIQUE FOR BROADCASTING MESSAGES ON A POINT-TO-POINT INTERCONNECT", issued on Sep. 29, 2009, as U.S. Pat. No. 7,596,653, which is incorporated herein by reference for all purposes.

FIELD

Embodiments of the invention relate to electronic networks. More particularly, some embodiments of the invention relate to broadcasting information across an electronics network across a point-to-point interconnect.

BACKGROUND

Prior art techniques of broadcasting messages of information within a network of electronics elements, such as a computer system, typically involve electronics elements, such as semiconductor devices, that reside on a common bus, or "shared" bus. In shared bus architectures, information may be shared by each agent residing on the bus by placing the data on the bus and assigning an address to the information that all agents on the bus will recognize. In other shared bus systems, other techniques for broadcasting information may be used, but in most shared bus systems, data is broadcast to the various bus agents via the bus upon which all agents reside, either directly or through coupling logic.

FIG. 1 illustrates a prior art shared bus system, wherein broadcast data broadcast across the bus is shared with all other agents residing on the bus. In the example illustrated in FIG. 1, there are no intermediate bus agents through which the broadcast data must pass in order to be sent to not only the intermediate agent, but all agents connected to the intermediate agent, and so on.

FIG. 2, on the other hand, illustrates a typical computer system in which bus agents, including processors, are connected via a point-to-point interconnect. FIG. 2 illustrates a number of bus agents residing on a number of different buses. Typically, each agent may be a transmitter and a receiver of information by assigning a particular address to each agent to which data being sent across a bus corresponds. Because the bus agents illustrated in FIG. 2 do not all reside on a shared bus, however, broadcast data cannot simply be placed on the bus of the transmitting agent and detected by each agent within the system.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to electronic networks. More particularly, embodiments of the invention relate to broadcasting messages between electronics components within a point-to-point interconnect.

Point-to-point interconnected networks typically use dedicated bus traces, or "lanes", to which bus agents within the network correspond. This allows, not only for greater network performance between network agents residing on a common bus ("link"), but similar network performance between agents residing on different links. In an embodiment of the invention, in which agents are interconnected via the same link, for example, a broadcast message may be sent to all agents within the network by merely sending the message across all links shared by an initiating agent and all target agents.

Figure 1:
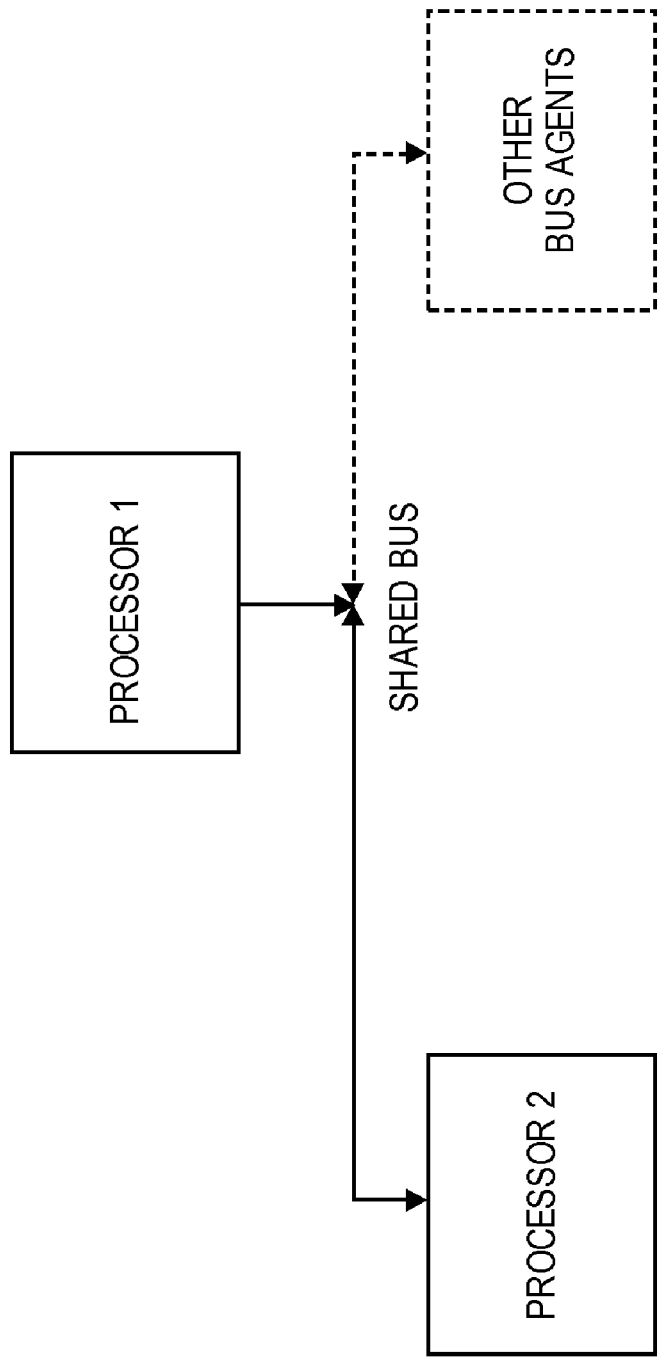
FIG. 1 illustrates a prior art electronics network in which network agents reside on a common, or "shared" bus.
Figure 2:
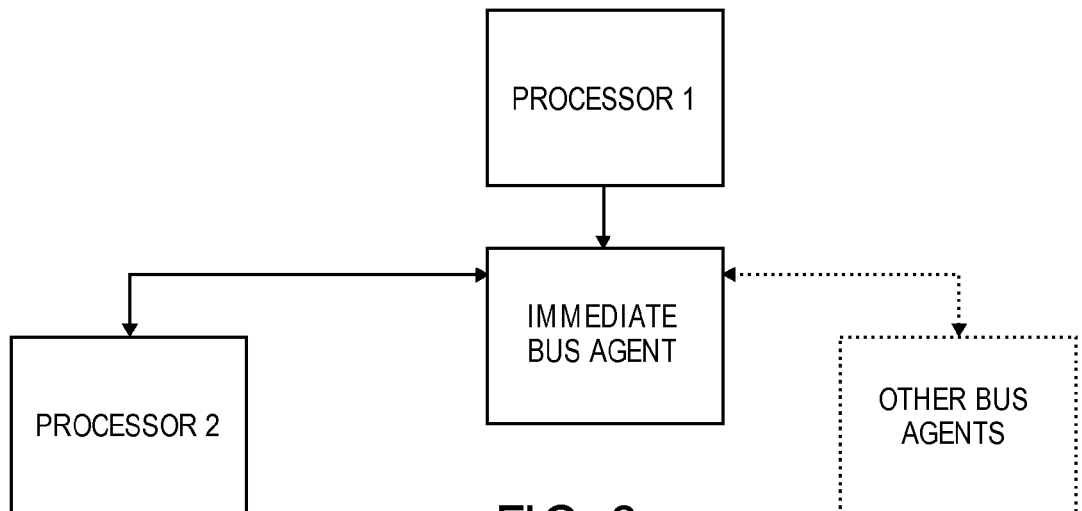
FIG. 2 illustrates a prior art electronics network in which network agents reside on multiple buses via a point-to-point interconnect.
Figure 3:
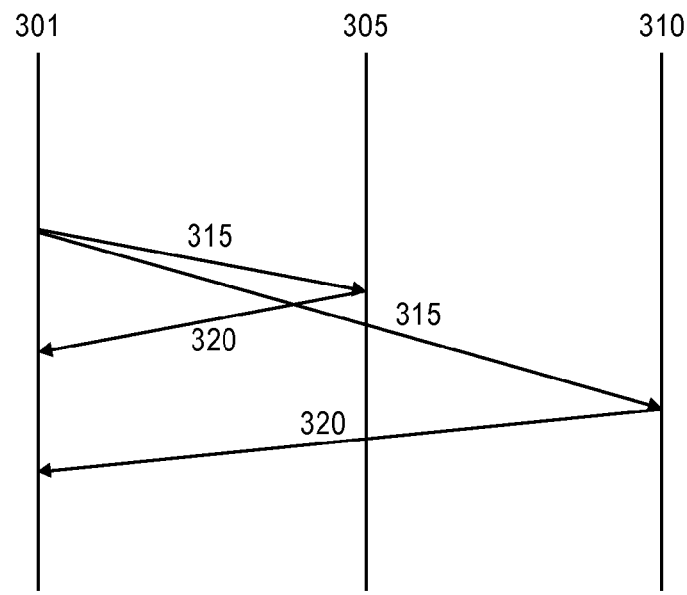
FIG. 3 illustrates a fully connected electronics network in which a broadcast message may be sent, according to one embodiment of the invention.

FIG. 3 illustrates a fully connected point-to-point network, in which at least one embodiment may be used. In particular, FIG. 3 illustrates, at least conceptually, an initiating processor 301, a target processor 305, and a target input/output ("I/O") controller hub 310. In order to broadcast a message to the target processor and the target I/O controller hub, the initiating process or may send the message 315 on the link from the initiating processor to the target processor and the link from the initiating processor and the target I/O controller hub along with a signal to indicate that each agent is an intended recipient of the message and should accordingly acknowledge 320 that they in fact have received the message.

In order to facilitate the interconnection of multiple agents residing on multiple links, however, the agents themselves typically act as both a transmitter ("initiator") and as a receiver ("target") of data placed on the link. Messages addressed to a particular agent within a point-to-point network may be transmitted by one agent residing on a first link, to another agent residing on a second link by each agent helping to route the message to the intended target agent. For example, in one embodiment, each agent may access a routing table to determine which next target agent the message should be sent to in order to ensure the message ultimately reaches it's intended target. The routing table may help to facilitate the shortest route, for example, to get the message from the initiating agent to the intended target.

In order for an initiating agent to broadcast a message to all or multiple bus agents within the point-to-point network, however, the message must not merely pass through an optimally short path through the network, but rather the message must be sent to each agent within the network. In one embodiment of the invention, the message is sent from an initiating agent along with a signal or address that indicates to each agent that the agent must relay the message to each agent with which it shares a link. Furthermore, in at least one embodiment, this is accomplished by assigning an address to a broadcast message that each agent within network may interpret as corresponding to a broadcast message and respond accordingly.

In other embodiments, the broadcast message may be of a certain message type that each agent interprets as being associated with a broadcast message. Yet, in other embodiments, the broadcast message may be associated with a signal, such as an interrupt signal, that other agents may interpret as being associated with a broadcast message and therefore respond accordingly.

Figure 4:
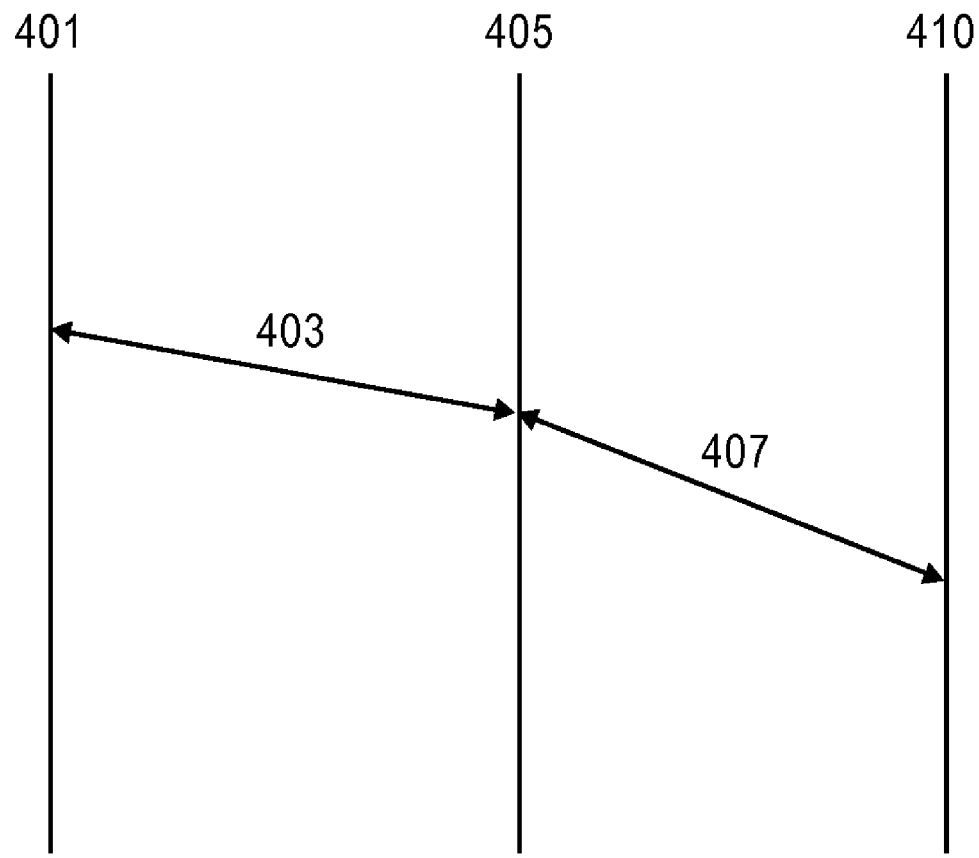
FIG. 4 illustrates a partially connected electronics network in which a broadcast message may be sent, according to one embodiment of the invention.

FIG. 4 illustrates a partially connected point-to-point network in which at least one embodiment of the invention may be used. In the network of FIG. 4, a first processor 401 sends a broadcast message by sending the message to a second processor 405 with which it shares a link 403. The second processor will then transmit the message to an I/O hub 410 that is within a link 407 of the second processor. In the partially connected configuration of FIG. 4, each agent (e.g., processors and I/O hub) act both as an initiator, when sending the message, and as a target, when receiving the message.

By each agent with in the network of FIG. 4 acting both as an initiator and as a target, a broadcast message can traverse the network and reach each intended recipient of the message within the network. Likewise, each agent in the network of FIG. 4, may send an acknowledgement back to the initiating agent and the agent from which the message was received via the same link in which the message was transmitted. Furthermore, each agent may wait to send an acknowledgement until it has received all acknowledgements, or some group of acknowledgements, from other agents for which it was an initiating agent.

The principles described in regard to the partially connected point-to-point network of FIG. 4 may be extended as the network scales in size. For example, the message may be sent by an initiating agent to each agent within a network with whom the initiating agent shares a link. Likewise, the recipient agents may act as initiators themselves and relay the message onto each agent with in the network with which they share a link.

In order to facilitate the broadcast of a message to each agent within a point-to-point network, such as the one illustrated in FIG. 4, the target agent(s) must recognize the message as corresponding to a broadcast message so that the agent(s) will pass the message onto agents which each shares a link. Furthermore, each target agent must know where to relay the message as an initiator agent once the message is received. In one embodiment of the invention, receiving agents recognize the message as being a broadcast message by interpreting the message type.

For example, in FIG. 4, the message type ("identifier") is a special transaction associated with a common system interface (CSI) protocol implemented within the point-to-point network, that acts as an interrupt to the target agents. Specifically, the first processor sends a packet of information to the second processor containing not only the data that is to be broadcast to the target agent(s), but also identity information that each target agent recognizes as an interrupt. Likewise, the second processor sends the data as well as the identifier to the I/O hub.

The identifier associated with each broadcast message within the partially connected point-to-point network of FIG. 4 and the fully connected point-to-point network of FIG. 3 is an interrupt, "SpecIntPhysical" that acts as an interrupt to the processors and I/O agent. The SpecIntPhysical is an interrupt associated with a particular CSI implementation. Furthermore, the SpecIntPhysical identifier differentiates the interrupt from other types of message types by associating with a particular address that each agent within the network is able to interpret as corresponding to a broadcast message. In other embodiments, the interrupt may be associated with other addresses that each agent may interpret as corresponding to a broadcast message.

Furthermore, in other embodiments, the identifier may not be an interrupt, but rather a signal that specifies a target agent within a list of targets agents. Within the networks of FIG. 3 and FIG. 4, the SpcIntPhysical identifier may be associated with target agents that are processors, in one embodiments. Therefore, the message would be broadcast to all target agents being identified as a processor within the point-to-point network.

Regardless of how the targets of the broadcast message are identified, each agent transmits the broadcast message, in at least one embodiment according to a look-up table identifying all agents with which an initiating agent shares a link. The broadcast message is thereby broadcast across each link described in each initiating agent's look-up table with which the initiating agent shares a link. This may then be repeated until the broadcast message reaches all agents, including intermediate targets, within the network.

For example, in one embodiment illustrated in FIG. 4, the second processor relays the broadcast message onto the I/O hub, because the I/O hub is listed within a look-up table that the second processor can access and determine that it shares a link with the I/O hub. Accordingly, if the second processor shared a link with another agent, the look-up table would indicate this as well and the broadcast message would be sent to that agent as well.

In the embodiments illustrates in FIG. 3 and FIG. 4, a signal indicating that the broadcast message has been received is sent from each target agent to the initiating agent from which it received the broadcast message. Only after each initiating agent has received a signal from all agents it broadcasted the message to indicating the broadcast message has been received, will the initiating agent send a "complete" signal to the agent from which it received the broadcast message.

In FIG. 3, the first processor receives "cmp" 320 signals from the second processor and the I/O hub indicating that the broadcast message has been received to the first processor and the I/O hub. The situation is a bit more complex in the case of a partially connected point-to-point network, such as the one illustrated in FIG. 4. In FIG. 4, the second processor will only send a "cmp" signal to the first processor to indicate the completion of the broadcast message after the second processor has received a "cmp" 420 signal from the I/O hub. Similarly, if several agents were connected to the second processor, the second processor would only send a "cmp" signal back to the first processor after it had received all "cmp" signals from all targets to which it sent the broadcast message.

Within the context of a CSI-based point-to-point network, in which the communication fabric is organized into functional layers, communication between network agents, such as the processors and I/O hub of FIGS. 3 and 4, is done using packets of information.

In other embodiments of the invention, other packet types may be used to communicate the broadcast message. Alternatively, other embodiments may use communication formats other than packets, such as dedicated bus signals, or an encoded signal within a larger data stream.

Figure 5:
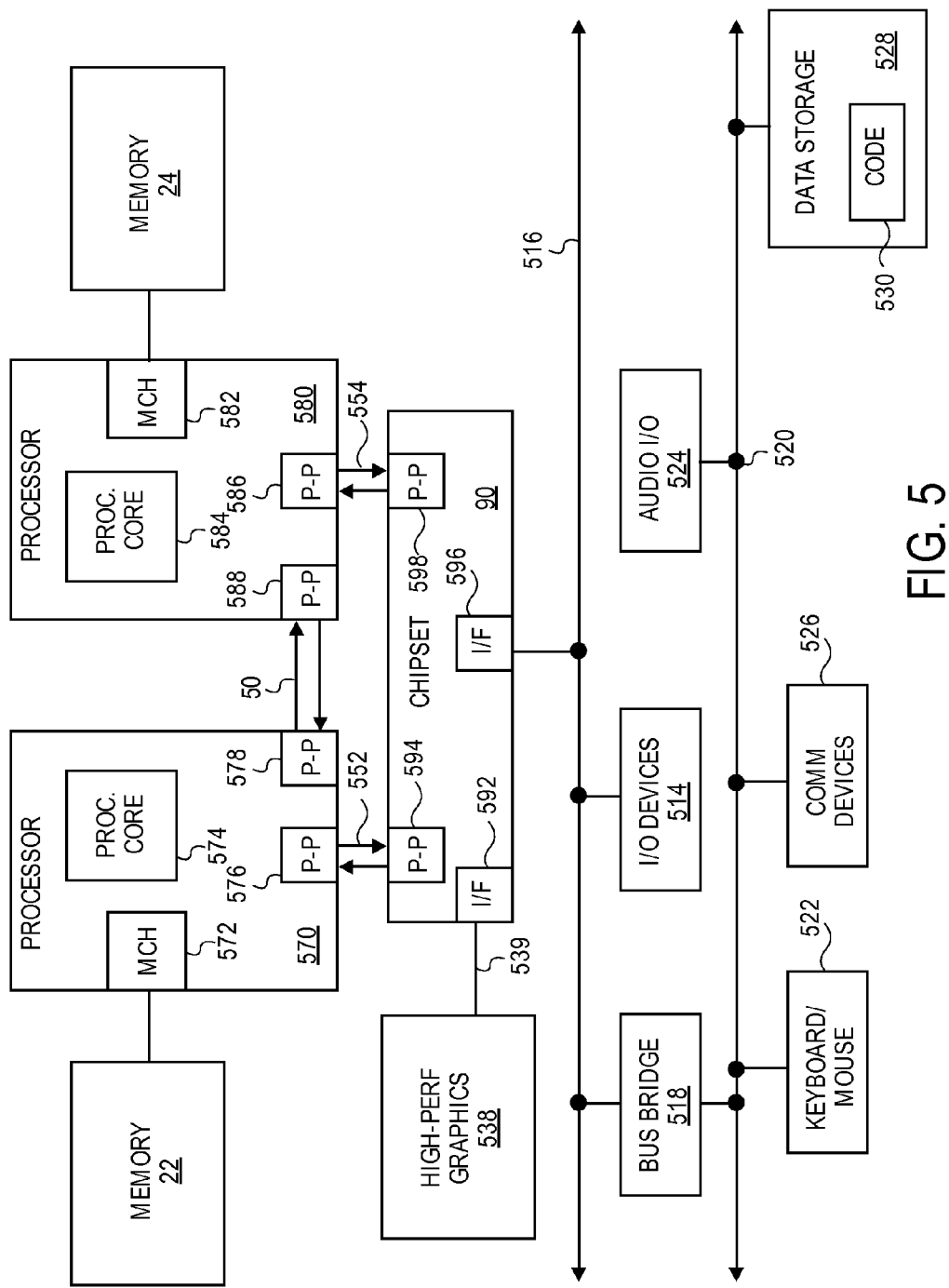
FIG. 5 illustrates a computer system in which one embodiment of the invention may be used.

FIG. 5 illustrates a network of electronic elements in which at least one embodiment of the invention may be used. Specifically, FIG. 5 illustrates a computer system that is arranged in a point-to-point (PtP) configuration. In particular, FIG. 5 shows a system where processors, memory, and input/output (I/O) devices are interconnected by a number of point-to-point interfaces.

The FIG. 5 system may also include several processors, of which only two, processors 570, 580 are shown for clarity. Processors 570, 580 may each include a local memory controller hub (MCH) 572, 582 to connect with memory 52, 54. Processors 570, 580 may exchange data via a point-to-point interface 550 using point-to-point interface circuits 578, 588. Processors 570, 580 may each exchange data with a chipset 590 via individual point-to-point interfaces 552, 554 using point to point interface circuits 576, 594, 586, 598. Chipset 590 may also exchange data with a high-performance graphics circuit 538 via a high-performance graphics interface 592.

At least one embodiment of the invention may be located within the memory controller hub 572 or 582 of the processors. Other embodiments of the invention, however, may exist in other circuits, logic units, or devices within the system of FIG. 5. Furthermore, other embodiments of the invention may be distributed throughout several circuits, logic units, or devices illustrated in FIG. 5.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

The invention claimed is:

1. An interconnect comprising:
   a first point-to-point link to couple a first agent and a second agent, the first agent to transmit a message to the second agent over the first link; and
   one or more point-to-point links to couple the second agent to one or more agents, the second agent to receive the message over the first link and to transmit the message to the one or more agents via the one or more point-to-point links in response to an address, corresponding to the message, that is received from the first agent to indicate that the message is to be transmitted to the one or more agents coupled to the second agent via the one or more point-to-point links,
   wherein the address, corresponding to the message, is to be interpreted by all agents coupled to the one or more point-to-point links as corresponding to a broadcast message and wherein the second agent is to indicate to the first agent that the message has been received by all of the one or more agents after the second agent has received a confirmation from all the one or more agents to which the second agent has sent the message.

2. The interconnect of claim 1 wherein the second agent is to decode the message to determine whether the message is directed at all agents coupled to the one or more links.

3. The interconnect of claim 1 wherein the message is to be sent to the second agent in parallel with the one or more agents.

4. The interconnect of claim 1 wherein each of the second agent and the one or more agents are to signal the first agent whether they have received the message.

5. The interconnect of claim 1 wherein the first, second, and the one or more agents are to communicate via a common system interface protocol.

6. The interconnect of claim 1 wherein the message comprises a signal to interrupt an agent that receives the message.

7. The interconnect of claim 1 wherein an agent is to maintain a look-up table to store addresses of all agents with which the agent shares a link.

8. The interconnect of claim 1 wherein the first agent is a processor and the second agent is an input/output hub device.

9. The interconnect of claim 1 wherein the first agent and the second agent are processors.

10. A method comprising:
    coupling a first agent and a second agent via a first point-to-point link, the first agent to transmit a message to the second agent over the first link;
    coupling the second agent to one or more agents, the second agent via one or more point-to-point links;
    receiving the message over the first link; and
    transmitting the message to the one or more agents via the one or more point-to-point link in response to an address, corresponding to the message, that is received from the first agent to indicate that the message is to be transmitted to the one or more agents coupled to the second agent via the one or more point-to-point links,
    wherein the address, corresponding to the message, is to be interpreted by all agents coupled to the one or more point-to-point links as corresponding to a broadcast message and wherein the second agent is to indicate to the first agent that the message has been received by all of the one or more agents after the second agent has received a confirmation from all the one or more agents to which the second agent has sent the messages.

11. The method of claim 10 further comprising the second agent decoding the message to determine whether the message is directed at all agents coupled to the one or more links.

12. The method of claim 10 further comprising sending the message to the second agent in parallel with the one or more agents.

13. The method of claim 10 further comprising signaling the first agent, by each of the second agent and the one or more agents, to indicate whether they have received the message.

14. The method of claim 10 further comprising the first, second, and the one or more agents communicating via a common system interface protocol.

15. The method of claim 10 wherein the message comprises a signal to interrupt an agent that receives the message.

16. The method of claim 15 wherein the message is a non-coherent bypass message within the common system interface protocol.

17. The method of claim 10 further comprising an agent maintaining a look-up table to store addresses of all agents with which the agent shares a link.

18. A computer readable medium to store one or more instructions to cause a processor to:
    couple a first agent and a second agent via a first point-to-point link, the first agent to transmit a message to the second agent over the first link;
    couple the second agent to one or more agents, the second agent via one or more point-to-point links;
    receive the message over the first link; and
    transmit the message to the one or more agents via the one or more point-to-point links in response to an address, corresponding to the message, that is received from the first agent to indicate that the message is to be transmitted to the one or more agents coupled to the second agent via the one or more point-to-point links,
    wherein the address, corresponding to the message, is to be interpreted by all agents coupled to the one or more point-to-point links as corresponding to a broadcast message and wherein the second agent is to indicate to the first agent that the message has been received by all of the one or more agents after the second agent has received a confirmation from all the one or more agents to which the second agent has sent the message.

19. The medium of claim 18, wherein the one or more instructions are to cause the processor to decode the message to determine whether the message is directed at all agents coupled to the one or more links.

20. The medium of claim 18, wherein the one or more instructions are to cause the processor to send the message to the second agent in parallel with the one or more agents.

21. The interconnect of claim 1, wherein the first agent is an initiating processor, the second agent is a target processor, and at least one of the one or more agents is an input/output controller hub.

* * * * *